United States Patent [19]

Wilding

[11] 4,037,320
[45] July 26, 1977

[54] APPARATUS FOR FORMING ARMATURE WINDINGS FOR COMMUTATOR TYPE DYNAMO/ELECTRIC MACHINES

[76] Inventor: Gerard Edward Wilding, 4 The Retreat, Englefield Green, Surrey, England

[21] Appl. No.: 644,049

[22] Filed: Dec. 24, 1975

Related U.S. Application Data

[62] Division of Ser. No. 460,553, April 12, 1974, Pat. No. 3,942,246.

[51] Int. Cl.$^2$ .......................................... H02K 15/09
[52] U.S. Cl. ................................... 29/733; 29/736; 242/7.05 A
[58] Field of Search ............ 29/596, 597, 598, 205 R, 29/205 CM, 205 D; 292/7.03, 7.05 A, 7.05 B, 7.05 C, 7.05 R; 310/234

[56] References Cited

U.S. PATENT DOCUMENTS 3,474,515  10/1969  Dammar .................... 29/205 CM

Primary Examiner—Carl E. Hall
Attorney, Agent, or Firm—Brisebois & Kruger

[57] ABSTRACT

Armature windings for commutator type dynamo-electric machines. The specification discloses a method, device and machine for enabling inter-coil lead wires to be reliably placed in and retained temporarily in a connection slot at the connection end of the relevant commutator bar by carrying a lead wire from one armature coil through that slot and along the commutator surface, looping the wire around the shaft at the end of the commutator, carrying the wire back along the commutator surface and through the slot, and leading it to the next armature core slot ready for the winding of the next coil.

28 Claims, 23 Drawing Figures

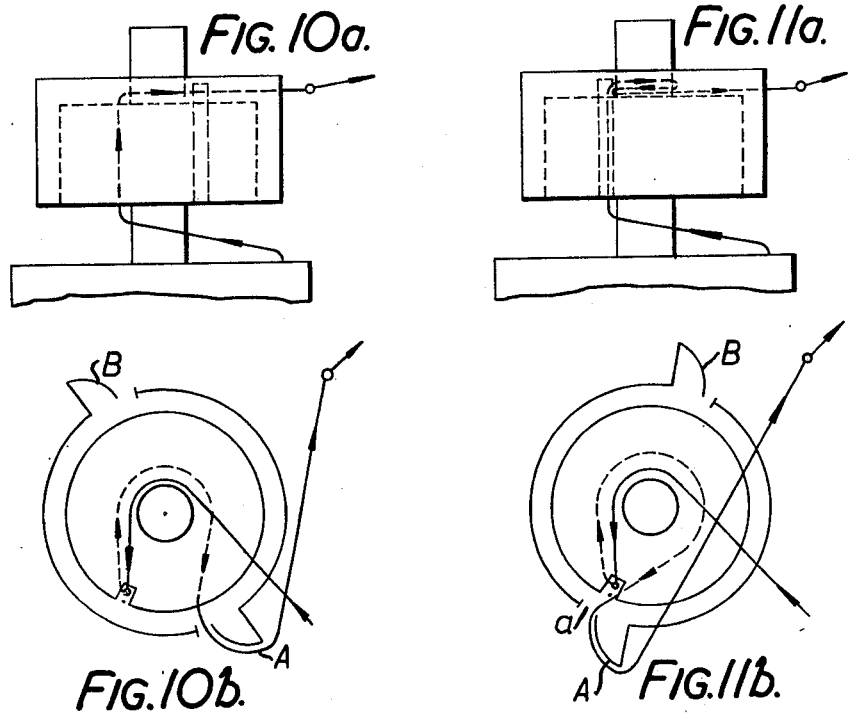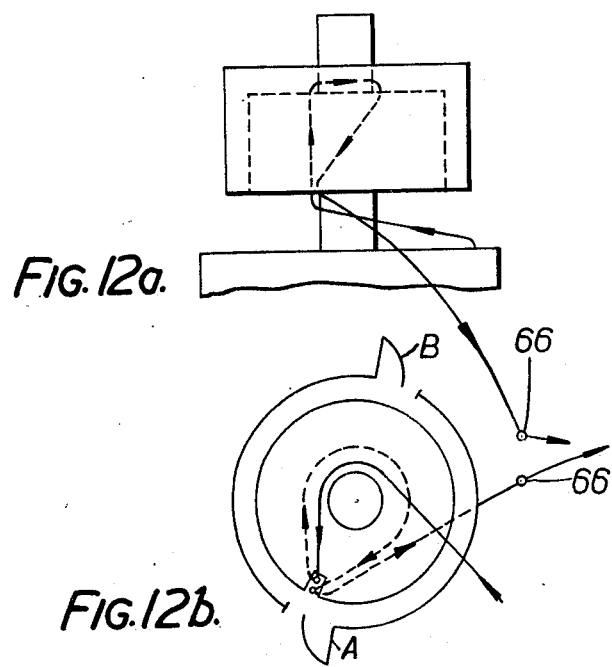

APPARATUS FOR FORMING ARMATURE WINDINGS FOR COMMUTATOR TYPE DYNAMO/ELECTRIC MACHINES

This application is a division of application Ser. No. 460,553, filed Apr. 12, 1974, now U.S. Pat. No. 3,942,246.

This invention relates to windings for wire wound armatures of commutator type dynamo-electric machines, and to methods of and apparatus for forming such windings.

At the present time the wire coils of an armature for a commutator machine are wound in situ in the armature core slots by high speed winding machines. During the course of winding such an armature, after a coil has been wound in situ, the wire is carried to the appropriate commutator bar or segment and is there looped around a connection hook formed integrally with the commutator bar, or alternatively is looped on itself through a single axial connection slot formed in the connection end of the commutator bar, before being carried to the next appropriate core slot for the winding in situ of the next coil. In the latter case each such loop lies flat on the commutator surface and is restrained in the connection slot merely by friction of the loop sides against the slot sides. This friction results from the resilience of the looped wire.

Whilst the hooked commutator bar is preferred to the slotted commutator bar, since during winding the wire looped around the hook of a commutator bar cannot become loose or escape, and is so held securely in readiness for electrically connecting the wire with the commutator bar, the hooked commutator bar has the great disadvantage of being more expensive than the corresponding slotted commutator bar.

With the slotted commutator bar the loops of wire in the respective connection slots are held only relatively insecurely (i.e. by friction) in position, so that after winding the coils on the armature the loops have to be checked for proper positioning in the respective slots, and then be positively held in position ready for the succeeding stages of electrically connecting the looped wire with the commutator bars and then removing the unwanted loop ends.

This checking and securing in position is a manual operation, and is consequently time consuming and expensive.

According to one aspect of the present invention a method of forming an electrical winding in situ on an armature of a commutator type dynamo-electric machine (the armature including a core slotted to receive and carry the winding and a commutator having in each conducting bar a slot for receiving connections from the winding) includes after winding each coil of the electrical winding in situ in its core slots using a wire drawn continuously from a wire supply source the steps of:

a. carrying the wire circumferentially to a predetermined commutator bar,
b. there placing the wire in the slot of that commutator bar,
c. carrying the wire axially along a cylindrical surface of the commutator surface,
d. looping the wire around a shaft protruding from the free end of the commutator,
e. returning the wire axially along the said commutator surface to the said commutator bar slot, and
f. carrying the wire through that slot towards a predetermined armature slot in readiness for the commencement of winding the next coil of the electrical winding.

If desired, the steps (c) to (e) may be carried out sequentially or alternatively in overlapping sequence.

Preferably, the wire is looped around the shaft in a direction opposite to that in which the wire progresses from the first-mentioned to the second-mentioned coil; and the wire is looped only once around the said shaft.

According to a second aspect of the present invention there is provided an armature for a dynamo-electric machine having an electrical winding wound by a method as set out in any one of the preceding three paragraphs.

According to a third aspect of the present invention an armature winding machine has a looping mechanism arranged to carry out any method according to the said first aspect of the present invention.

Such an armature winding machine preferably has a wire looping mechanism which includes at least one wire looping device carried on a rotatable driving member which is disposed when the machine is in operation coaxially with an armature to be wound, the driving member being arranged for axial movement relative to the said armature whereby to move the looping device between a first axial position disposed adjacent the cylindrical surface of the commutator and a second axial position in which the looping device is axially clear of the said commutator surface, and for rotary movement relative to the said armature whereby to move the looping device around the axis of the said armature, the looping device extending when in the first axial position axially over the whole of the said commutator surface, and including an axially-extending radial wing having on one side thereof an axially-extending step for carrying a wire from a completed winding coil to the said predetermined commutator bar connection slot on rotational movement of the looping device in a first direction, and on the other side thereof an open-ended, axially-extending, radial slot for carrying the said wire, ahead of the said wing, a second time to the said connection slot on rotational movement of the looping device in a second and opposite direction, the looping mechanism also including means for driving the said driving member axially and rotationally in a a predetermined sequence for carrying out the said method.

Preferably, the said wing has on one side thereof a radial flank defining one wall of the said step, and on the other side thereof a curved flank to facilitate sliding movement of the wire over that side of the wing on rotational movement of the looping device in the said second direction; and the said curved flank is outwardly convex in both the axial and circumferential directions relative to the said commutator surface.

According to another preferred feature of this third aspect of the present invention the said wing includes a movable element disposed adjacent to and defining one axially-extending wall of the said radial slot, and including means for moving the said element in a radial direction onto the said commutator surface whereby to temporarily close a clearance gap between the looping device and that surface whenever the wire carried in the said radial slot is to be placed in the said predetermined commutator bar connection slot after carrying the wire in the said radial slot during movement of the looping device in the said second direction.

In a preferred arrangement the looping device forms part of a cup-shaped cylindrical shroud for protecting the said commutator surface whilst winding each of the said coils in its core slots, the said wing projecting radially from the outer surface of the shroud, and the said radial slot being cut in the shroud.

The looping mechanism may also include a second and similar looping device carried on the said driving member whereby to enable wires from two completed coils to be inserted simultaneously into two predetermined commutator bar connection slots, and subsequently to be carried to two predetermined core slots in readiness for winding simultaneously the next pair of coils.

According to another preferred feature of this third aspect of the present invention the looping mechanism is arranged to drive the said driving member axially and rotationally in the following sequence of steps:

a. with the or each looping device in the first axial position, to rotate the or each looping device in the said first direction from a 'wire pick-up' position to a 'wire-placing' position adjacent a predetermined commutator bar connection slot, b. to move the or each looping device axially to the second axial position, c. to rotate the or each looping device in the said second direction to a 'wire-release' position, d. to rotate the or each looping device a short distance in the said first direction so as to align the or each said radial slot with the or each wire, e. to move the or each looping device axially to the said first position so as to engage the or each wire in the or each said radial slot, and f. to rotate the or each looping device in the said second direction whereby to carry the or each wire in the or each said radial slot to the 'wire-placing' position adjacent the or each said commutator bar connection slot.

According to a fourth aspect of the present invention there is provided a wire looping device and a rotatable driving member in combination, and as defined in any of the preceding paragraphs.

One armature for a commutator type dynamo-electric machine wound according to the present invention will now be described, together with its method of winding and the apparatus used in carrying out the winding method, by way of example and with reference to the accompanying drawings in which:

FIGS. 6a, 6b to 12a, 12b show a sequence of diagrams appropriate to successive stages in the process of forming a loop in an interconnecting wire between adjacent coils, each 'a' diagram showing a plan view of the commutator and adjacent parts of the armature, and each 'b' diagram showing an end view of the commutator and looper as seen from the core;

Figure 1:
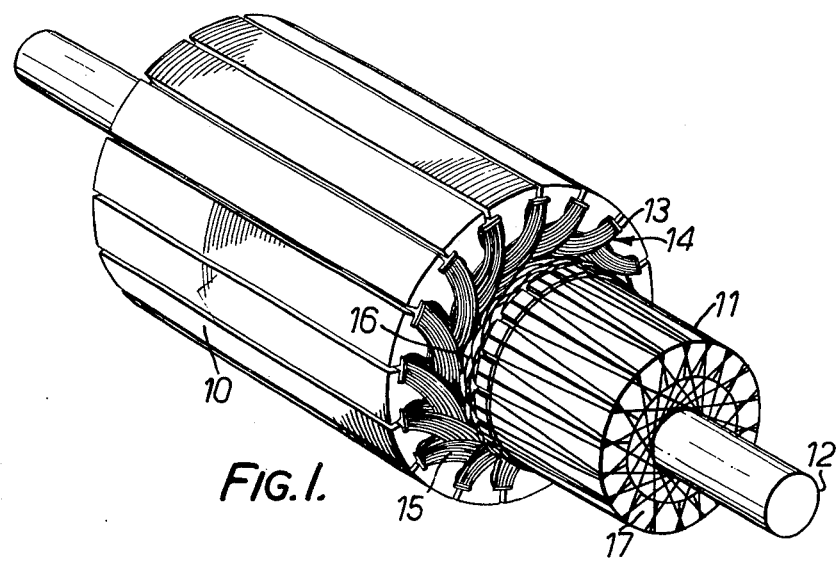
FIG. 1 shows a perspective view of the armature after completion of the winding stage, but before the winding is electrically connected to the commutator.
Figure 2:
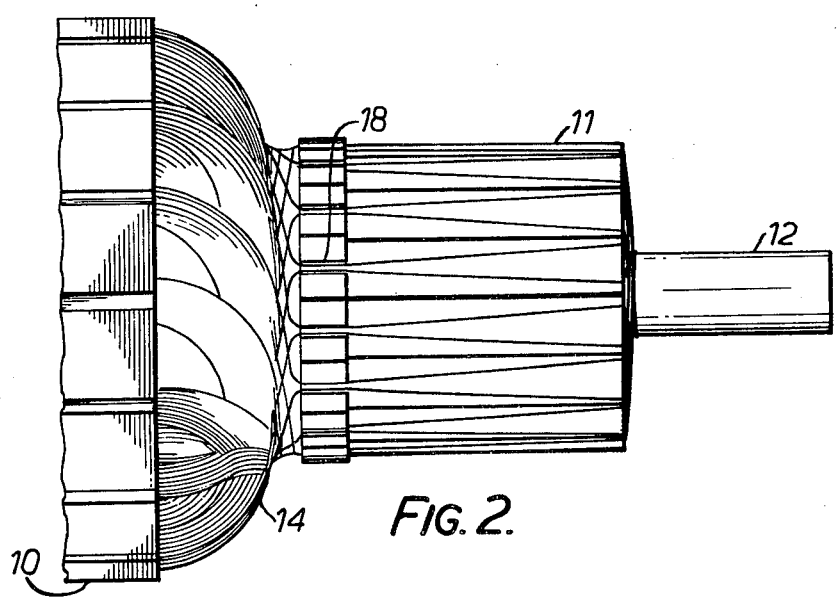
FIG. 2 shows a side elevation of the commutator and adjacent parts of the armature core and winding.
Figure 3:
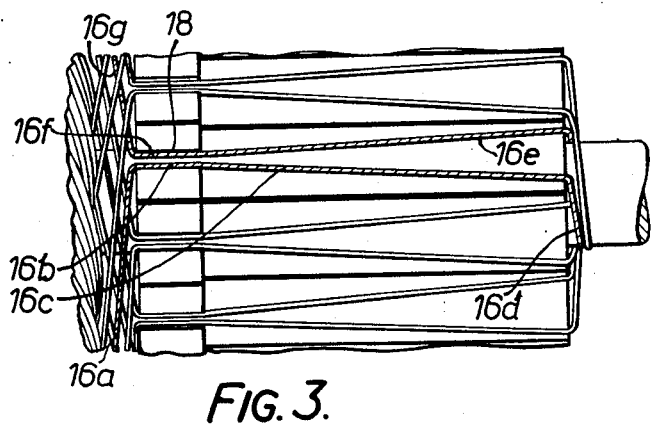
FIG. 3 shows an enlargement of part of the view shown in FIG. 2.

Referring now to FIGS. 1, 2 and 3 the armature comprises a laminated ferro-magnetic core 10 and a commutator 11, both mounted in conventional manner at axially-spaced positions on a shaft 12. The core has slots 13 in which is laid an armature winding 14. The winding comprises a plurality of wire-wound coils 15 linked together in a continuous closed electric circuit by interconnecting wires 16.

Each interconnecting wire progresses around the armature from the one coil to the next by way of the associated bar or segment 17 of the commutator 11.

On arrival at the associated commutator bar the connecting wire changes from a circumferential to an axial direction and passes into an axial connection slot 18 formed in the inner or connection end of the commutator bar. From there it proceeds along the outer surface of the commutator in a generally axial direction, and at the outer end of the commutator changes from an axial to a radial direction to pass across the outer or free end of the commutator and loop around the shaft 12. It then returns across the outer end of the commutator and again passes axially along the commutator surface to the slot 18, where it reverts to the circumferential direction and proceeds to the next coil.

The route followed by one such connecting wire is emphasized and identified in FIG. 3 by cross-hatching and by references 16a to 16g.

It will be appreciated that the loop formed in each interconnecting wire is positively retained in position by the shaft, and by the substantial frictional engagement of each loop side with the corners of the respective sides of the associated connection slot 18.

The free wire ends of the first and last to be wound coils are after completion of the winding of the coils in situ, twisted together after first looping in the above described manner around the shaft 12.

Thus in the condition shown, i.e. after completion of the coil winding stage, the coil interconnecting wires 16 are all positively and securely held in position on the armature, so that the next stage in the manufacture of the armature (that of fusing — 'staking' — the interconnecting wires to the commutator bars where they pass through the slots 18, and then severing and removing — 'cropping' — the loops from around the shaft) can be carried out without any manual preparation to ensure that interconnecting wire loops are correctly positioned and positively secured in the commutator bar connection slots.

The coils 15 are wound in situ in the slots 13 by a conventional high speed coil winding machine, and this machine may wind one coil at a time, or alternatively wind at the same time two coils disposed diammetrically opposite one another on the armature.

Figure 4:
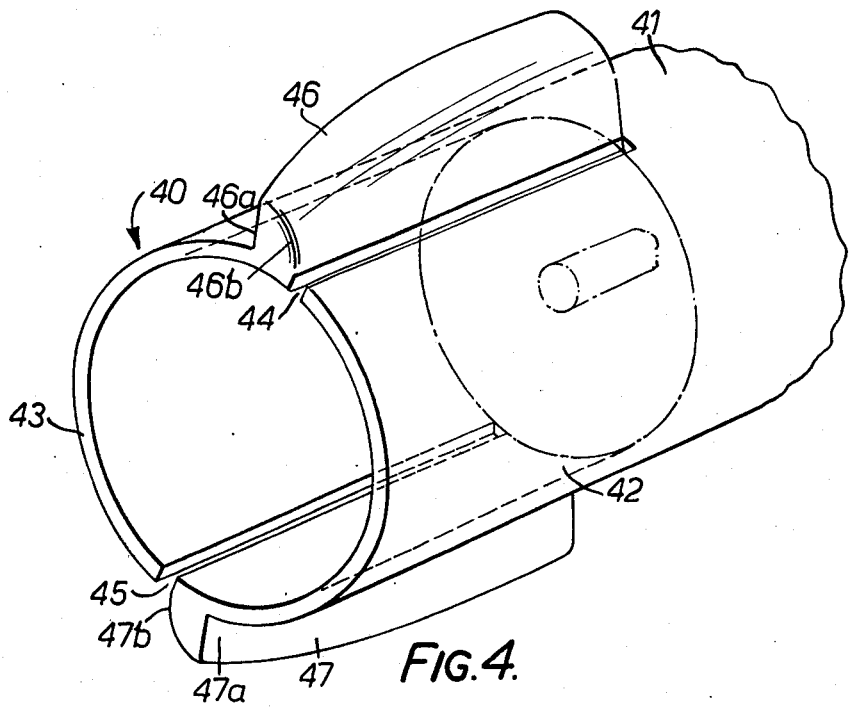
FIG. 4 shows a perspective view of a wire looper used in winding the armature.
Figure 5:
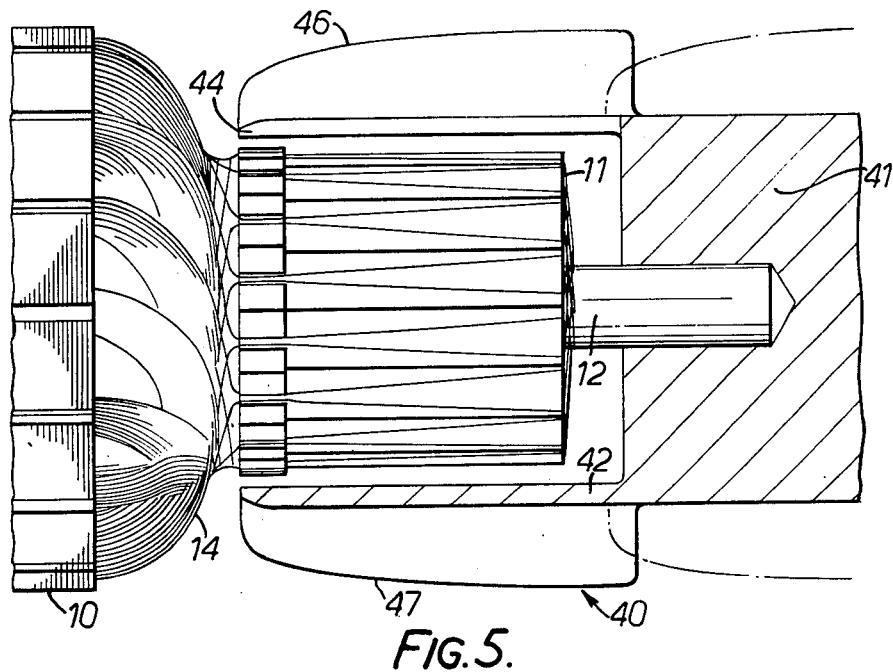
FIG. 5 shows a side elevation of the commutator and adjacent parts of the core and winding, with the looper shown partly in section in a forward 'wire-placing' position.

This winding machine is, however, modified to include a rotatable wire looper which is shown in the FIGS. 4 and 5.

This looper, generally indicated at 40 in FIG. 4, comprises a shank portion 41 having formed integrally therewith a cup-shaped portion 42. This latter portion has a thin wall 43 in which are formed at diametrically-opposite positions two narrow, axially-extending, radial slots 44 and 45. Adjacent each slot, in symmetrical positions, are two radially-projecting, axially-extending wings 46, 47 which are specially shaped in the manner indicated in the figures so as to enable the automatic formation of the loops in the interconnecting wires 16. Each wing has a radial flank 46a, 47a and a curved flank 46b, 47b, and each wing smoothly and progressively reduces in radial height as the rim of the cup is approached.

The looper is mounted by its shank in driving means which are arranged to provide axial and rotary motion as required by the looping sequence which will be described below.

The looper is required to operate in two alternative axially-spaced positions namely (a) forward or 'wire-placing' position (full lines in FIG. 5), and (b) a withdrawn or 'wire-looping' position (chain-dotted lines in FIG. 5), and to rotate in both directions between angularly spaced 'wire pick-up' and 'wire-depositing' positions.

The sequence of looper movements will appear from the following escription of a looping sequence with reference to the FIGS. 6a, 6b to 12a, 12b and 14.

Figure 14:
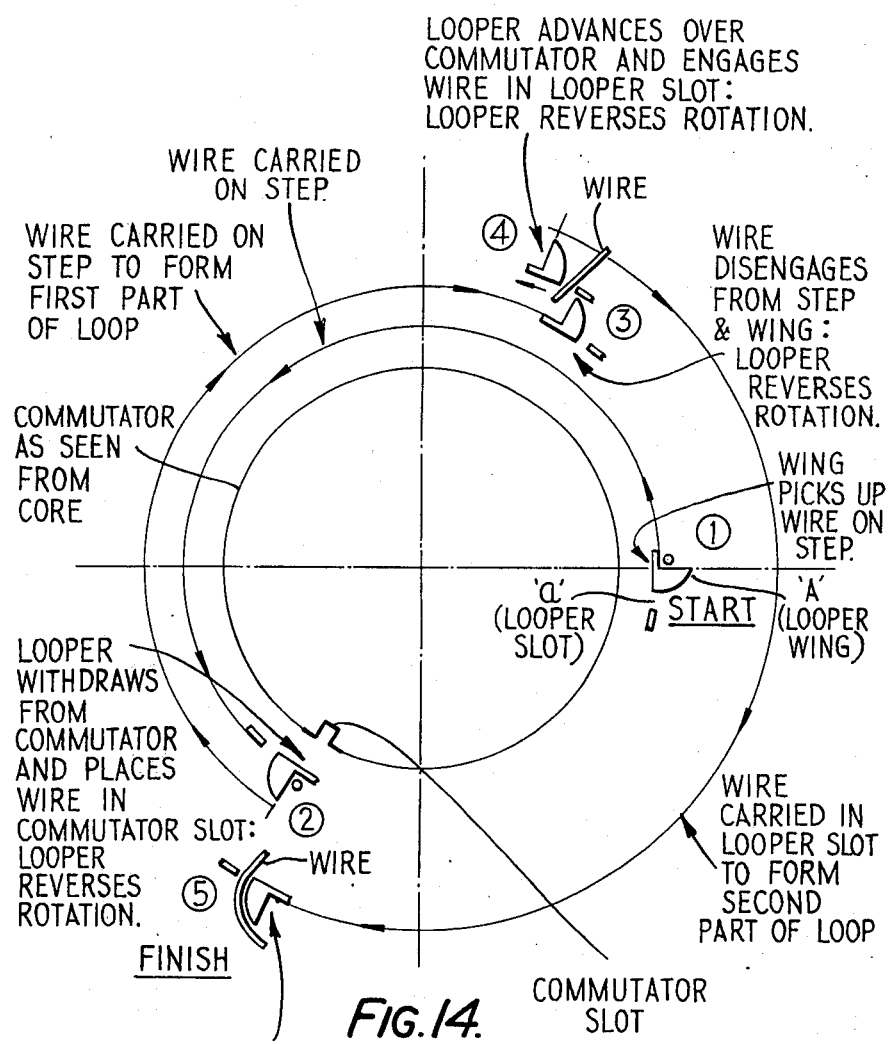
FIG. 14 shows diagrammatically the sequence of rotational movements made by the looper, as seen from the armature core, during the process of forming a loop in an interconnecting wire between adjacent coils.

With the armature clamped in a predetermined coil winding position (so that the plane of the coil to be wound is vertical), and the looper in a forward 'coil-winding' position, i.e. in the said wire-placing position and with the wings at the 4 and 10 o'clock positions respectively as seen in the FIG. 14, the conventional winding machine mechanism winds a first coil in two circumferentially spaced armature slots. On completion of that coil the flyer (through which the wire passes under tension from a wire supply source to the armature) of the machine is stopped and held in a position 60 just beyond the outer end of the commutator, with the wire stretching axially from the lower coil side across the cylindrical surface of the commutator, as indicated at 61 in the diagrams 6a and 6b.

It should be noted here that when in operation, winding a coil, the flyer is moved by driving means (not shown) around a circular path disposed in a vertical longitudinal plane which includes the position 60; the said path has its longitudinal mid-position disposed opposite the centre of the armature core. Thus the position 60 represents approximately the 3 o'clock position of the flyer on its circular path, that is, as viewed from the left hand side of FIG. 6b.

In the diagrams 6a and 6b, and the others that follow, the looper is represented in outline by the profiles 62 and 63, in which the wings are shown at 'A' and 'B' and the associated wire-carrying slots at 'a' and 'b', and the commutator is represented by a circle 64 having a slot 'S' representing the connection slot 18 in the relevant commutator bar. In what follows rotations of the wire looper will be expressed as clockwise and anti-clockwise rotations as seen from the core of the armature, i.e. as seen in the FIGS. 6b to 12b and 14.

The looper is now rotated in an anti-clockwise direction, so as to pick up (at position 1 in FIG. 14) and carry the wire from position 61 around the commutator into a position (position 2 in FIG. 14) in alignment with the commutator bar connection slot S. This condition is shown in the FIGS. 7a and 7b. The looper is then moved axially to the withdrawn position so as to cause the wire to be drawn (or placed) into the connection slot S.

Whilst the looper is held in the withdrawn position it is rotated in a clockwise sense relative to the commutator. When the wing A reaches the 2 o'clock position approximately (position 3 in FIG. 14) the wire disengages from the wing A. The flyer is then moved in an anti-clockwise direction along its circular path to approximately the 2 o'clock position so that the flyer now lies in position 65 opposite the space between the rim of the looper and the end of the commutator. The wire thus lies between the rim of the looper and the commutator. This condition is shown in the FIGS. 8a and 8b.

The looper is now reversed in an anti-clockwise direction through a few degrees to position 4 in FIG. 14 so as to position the wire-carrying slot $a$ in alignment with the wire passing to the flyer, and the looper is then moved axially forward over the commutator to the 'wire-placing' position, with the wire trapped in the slot $a$. This condition is shown in the FIGS. 9a and 9b.

The looper is then rotated clockwise to loop the wire around the shaft. A typical condition during this stage is shown in the FIGS. 10a and 10b. The looper is stopped when the wire-carrying slot $a$ lies in alignment with the connection slot S (position 5 in FIG. 14) as shown in the FIGS. 11a and 11b.

At this stage the flyer is moved further along its circular path in an anti-clockwise sense to approximately the 9 o'clock position 66, so that the wire then resting on the curved flank of wing A is flicked axially along that curved flank towards the core. In so doing the wire slips off the free end of the wing A and falls into the connection slot S. This condition is shown in FIGS. 12a and 12b.

The loop is now completed, and the armature is indexed angularly to the next coil winding position, and the looper is rotated to the aforementioned coil-winding position in readiness for the winding of the next coil in the next appropriate pair of slots.

After completion of the next coil the looper is rotated to pick up the wire (at position 1 in FIG. 14) and to transport it to the connection slot S (position 2 in FIG. 14) in the next appropriate commutator bar. The looping cycle described above is then repeated so as to loop that next inter-connecting wire around the shaft 12.

When the coil winding machine is arranged to wind simultaneously two diametrically-opposite coils, the looper may be arranged to loop the inter-connecting wires for both coils simultaneously, using both wings and associated wire-carrying slots to handle the two interconnecting wires at the same time.

The looping sequence described above may be modified if desired to carry the coil inter-connecting wires in the opposite sense around the armature.

Figure 13:
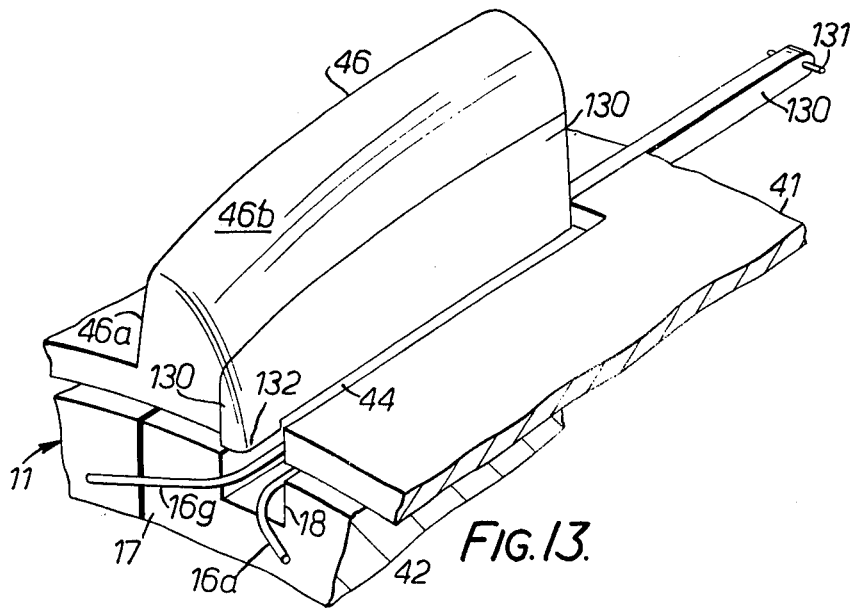
FIG. 13 shows a perspective view of one wing of a modified form of the looper shown in FIG. 4.
Figure 6A:
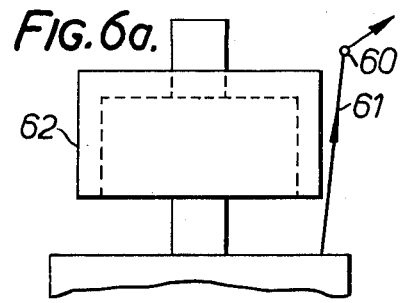
Figure 7A:
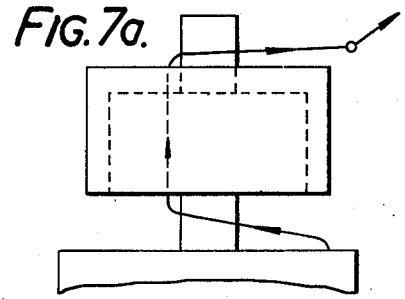
Figure 6B:
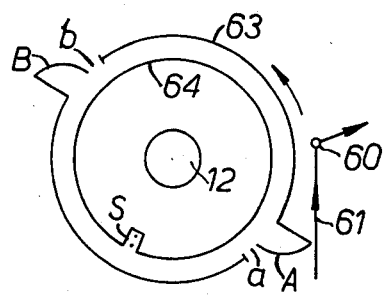
Figure 7B:
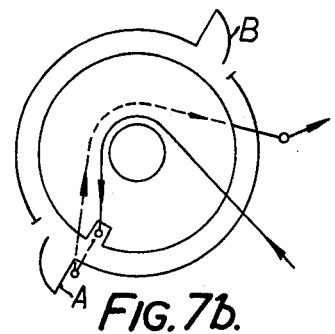
Figure 8A:
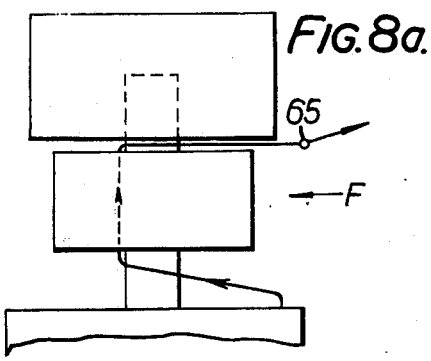
Figure 9A:
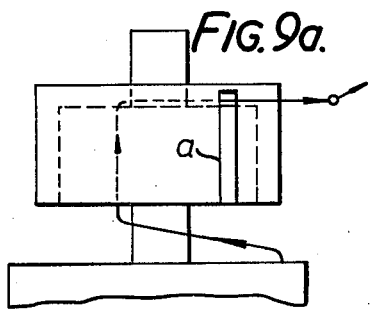
Figure 8B:
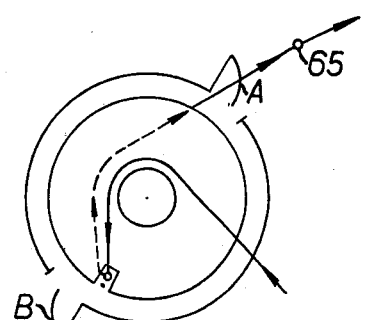
Figure 9B:
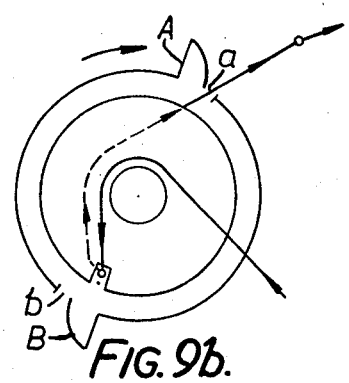

In a modified form of looper shown in FIG. 13 each wing has a movable wedge-shaped section 130 lying adjacent the wire-carrying slot 44, 45. This movable section is pivoted on the looper at position 131 for angular movement in a radial plane so as to enable the nose end 132 to move radially inward when required so as to close the radial gap between the inner surface of the looper and the outer surface of the commutator (as shown in the FIG. 13). This gap is required to give the necessary clearance for the array of wire loops which is being wound around the commutator. This array has in some places a total depth of four wire diameters.

Radial movement of each such movable section 130 is obtained automatically by a cam arrangement (not shown) which becomes effective as the looper moves into position 5 of FIG. 14 to lower the movable section from the raised (normal) position to the lowered position shown in FIG. 13. This is achieved by advancing the looper a further 1/16 inch towards the core. Before rotating the looper from the said position 5, on completion of the loop, to the said coil-winding position, the looper is withdrawn through the said 1/16 inch so as to cause the movable section to be raised to the normal position, thereby providing the necessary radial clearance from the commutator surface and any looped interconnecting wires lying thereon.

Whereas in the above description the looper comprises a cup-shaped cylindrical shroud from which the wings 46, 47 project radially, and in which the wire-carrying slots 44, 45 are formed, the looper may alternatively comprise only those parts which are necessary to define the wings and their associated slots, the rest of the cylindrical shroud being omitted. When such a modified (and more rudimentary) looper is used, other shrouding means must be provided for protecting the commutator against damage during the process of high speed coil winding.

An improved result is obtained from the above described method of winding, if, when aligning with a desired commutator bar slot S the wire carried round by a lopper flank 46a, 47a, or in a looper slot 44, 45, the looper is allowed to come to rest just beyond (in the direction of movement) the desired radially-aligned position, and is then reversed at low-speed to that desired position. This solidification gives a more positive placement of the wire in the desired slot S.

This modification obviates the need to stop the looper with great precision at the end of its high speed travel between the positions 1 and 2, and 4 and 5 in FIG. 14. The tolerance available on the stopping positions at 2 and 5 is thus equal to almost the pitch on the commutator bars less the width of the slot S. The desired precision in positioning the looper finally at the positions 2 and 5 is much more readily obtained in the aforesaid slow-speed reverse movements.

In a convenient form of winding machine for carrying out the methods described above, the armature is held between two shaft supports which engage the respective ends of the shaft, and the looper is disposed concentrically on one of the said shaft supports. This shaft support has formed thereon a cam for operating the wedge-shaped edge sections 130 of the looper wings shown in the FIG. 13 as the looper is moved axially relative to the armature commutator. Thus the first part of the travel of the looper axially away from the forward 'wire-placing' position lifts each edge section 130 off the commutator surface, whilst conversely the last part of the travel towards that forward position causes each edge section 130 to be lowered on to the commutator surface.

Conveniently, the axial movement of the looper is achieved by a ram which may be pneumatically or hydraulically operated and/or controlled. Likewise, the rotary movement of the looper may be conveniently achieved by means of a similar ram, preferably by way of a rack which engages with a ring of teeth carried around the periphery of the looper shaft.

Figure 15:
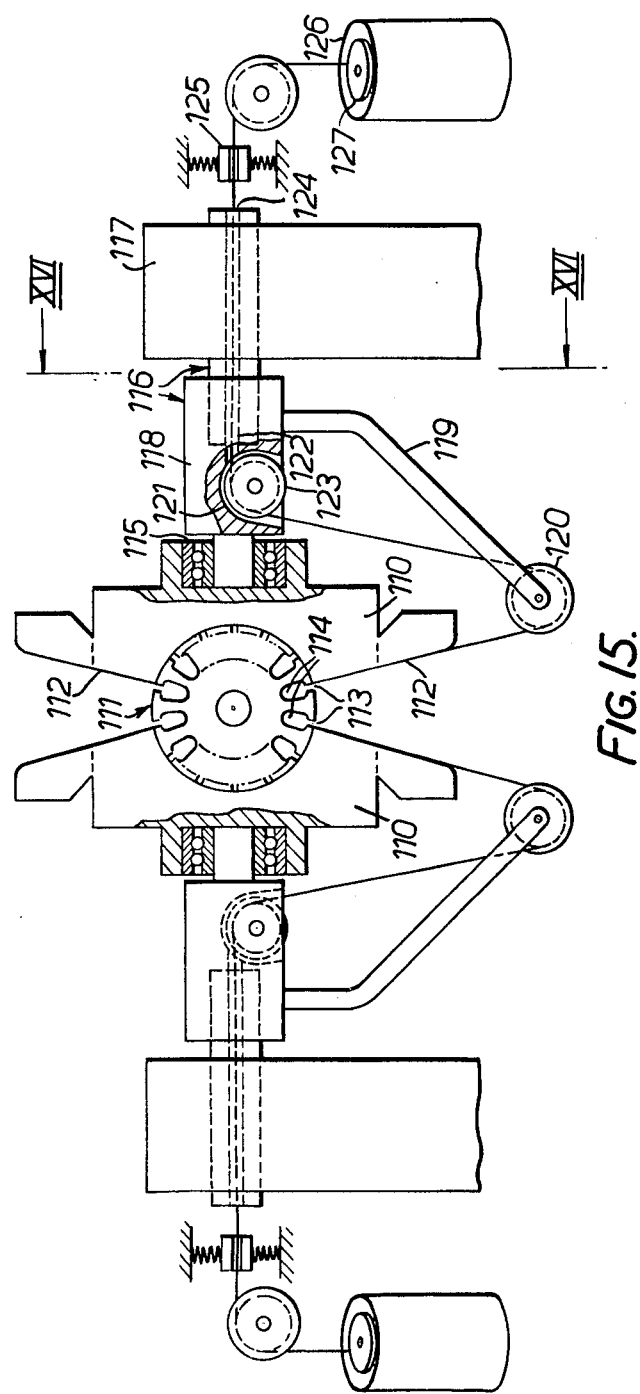
FIG. 15 shows diagrammatically a front elevation of the relevant principal parts of a high speed automatic armature winding machine equipped to put the present invention into practice, and embodying the looper shown in FIG. 13.
Figure 16:
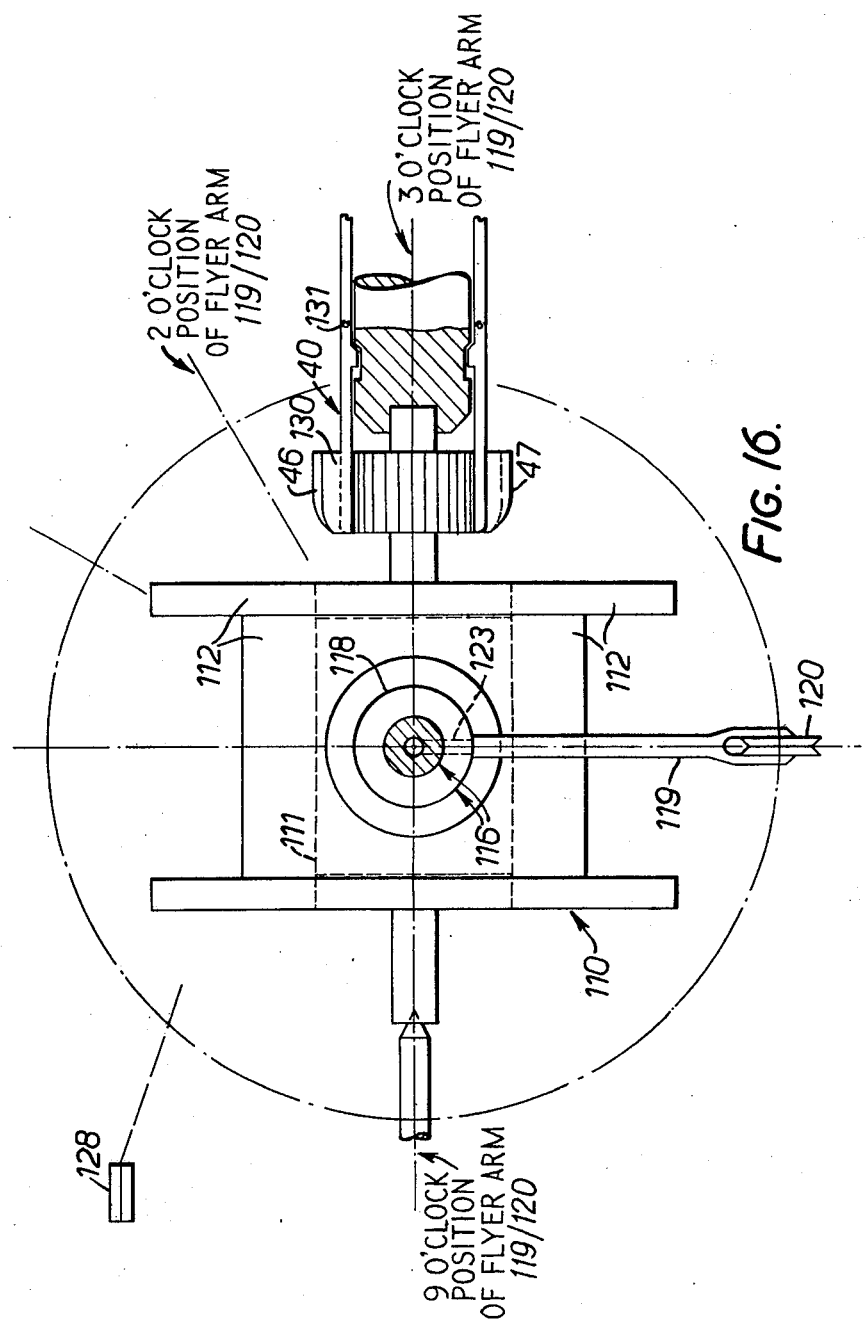
FIG. 16 shows diagrammatically a part sectional side view as seen from the section line XVI—XVI shown in FIG. 15.

Referring now to the FIGS. 15 and 16, an example of a high-speed armature winding machine to which the present invention may be applied includes two specially-shaped jaws or chucks 110 which are arranged for movement along an axis transverse to the longitudinal axis of an armature 111 to be wound, whereby to grip or release the surface of the armature as required. In the drawing the jaws are shown gripping the armature; in this position inclined wire guide surfaces 112 of each jaw are aligned with the mouths 113 of two armature slots 114 in which a coil is to be wound in situ. The guide surfaces are substantially radial to the longitudinal axis of the armature, and are appropriately curved at their outer parts to assist the placing of the wire when coil winding.

Since the two jaws are similar and are used in the same way, only one of them will be referred to in what follows.

Each jaw is carried on a thrust bearing 115 mounted at the free end of a composite wire-feed tube 116 aligned along the aforesaid transverse axis, and this tube projects in cantilever manner from a mechanism 117 which supports the tube, controls its position along the said axis, and rotates it about the said axis, as required under the control of control apparatus not specifically shown. Rotation of the feed tube may be achieved, preferably, by a built-in electric motor, though axial movement of the jaw and tube towards and away from the armature is preferably achieved by a pneumatic or hydraulic ram.

The feed tube 116 includes adjacent the associated jaw a socket 118 which carries at its free end the said thrust bearing 115 and intermediate its ends a radially-extending 'flyer arm' 119 which is carnked towards and over the adjacent jaw. At its extremity the arm carries a free-running wire-guide pulley 120. The socket has a radial slot 121 formed therein at a position intermediate the thrust bearing and the flyer arm, the slot being radially aligned with the flyer arm and communicating with an axial bore 122 of the socket. A second free-running wire-guide pulley 123 is mounted in the radial slot, radially in line with the first wire-guide pulley 120.

The bore end 124 of the feed tube remote from the associated jaw opens adjacent a frictional wire tensioning device 125, and below this device is a wire supply bin 126 in which is disposed a stationary spool of wire 127.

To commence the process of winding the armature coils the free end of the wire is withdrawn from the supply bin, and is threaded through the frictional tensioning device, the bores of the composite feed tube, the radial slot in the socket, and over the two wire-guide pulleys, the flyer arm then being in the 3 o'clock position as seen looking from the feed tube to the armature, and finally lead to a wire clamping device 128 disposed above but in line with the armature and at the non-commutator end thereof.

The coil is wound in the two slots by rotating the feed tube 116 at high speed, whereby to move the wire-guide pulley 120 at the extremity of the flyer arm 119 around the jaws and hence around the armature. The wire drawn through the feed tube by movement of the flyer arm is guided over the respective wire guide surfaces 112 of the jaw and is laid successively in alternate armature slots, thus forming the desired coil.

After the desired number of turns of wire has been laid in the slots rotation of the feed tube and flyer arm is suspended. Thereupon the looper mechanism described earlier in this specification is actuated to carry out the above-described method of laying the wire in the appropriate commutator bar slot 'S' (as referred to earlier) and looping it around the shaft.

Thereafter the armature is rotated one or more armature slot pitches relative to the jaws, as required by the electrical specification of the armature winding, by an indexing mechanism not shown so as to bring the next appropriate pair of armature slots into the respective positions adjacent the jaw wire-guiding surfaces, the grip of the jaws being temporarily relaxed during this indexing step.

The feed tube and flyer arm are then rotated again a predetermined number of times so as to wind the next coil, and the looping sequence is again carried out.

The respective steps are repeated until all of the armature coils have been wound in situ in the armature slots.

By the use of appropriate control apparatus the machine can be made to wind the armature completely without human intervention, to produce an armature as shown in FIGS. 1 to 3.

I claim:

1. Wire looping means for laying a wire in the connection slots of a commutator carried by the armature shaft of a dynamo-electric machine, said wire looping means comprising:
    a drive shaft having a common axis for rotary and axial reciprocatory motion, and
    at least one wire-looping arm carried at one end of said drive shaft and extending in a direction parallel to but spaced from said common axis,
    said arm having a wire-transporting, radial projection extending axially along the surface thereof that is remote from said common axis,
    an open-ended, wire-transporting, radial slot being formed in said arm, said radial slot being disposed beside said projection and extending axially towards said drive shaft,
    and said arm and said radial slot being dimensioned so as when in operation to extend axially over said commutator and said connection slots when said drive shaft is axially aligned with and disposed adjacent said armature shaft.

2. Wire looping means according to claim 1, wherein said radial projection defines on the side thereof remote from said radial slot and axially-extending, wire-transporting step for picking up and transporting (when said means is in operation) a said wire to a selected connection slot on rotation of said drive shaft in a direction such that said step is then on the leading side of said arm.

3. Wire looping means according to claim 2, wherein said radial projection defines on the side thereof adjacent said radial slot a smooth, curved, wire-guiding surface leading into said radial slot for guiding (when said means is in operation) a said wire smoothly into said radial slot on rotation of said drive shaft in an opposite direction.

4. Wire looping means according to claim 3, wherein said wire-guiding surface is outwardly convex in both axial and circumferential directions relative to said common axis.

5. Wire looping means according to claim 3, wherein a slice of said arm lying adjacent said radial slot and the radially-adjoining part of said radial projection together constitute a radially movable element, which element defines one axially-extending side wall of said radial slot and is mounted for movement in a radial direction relative to adjacent parts of said arm and said radial projection so that a part of said movable elements lying nearest said common axis may be caused to project inwardly of adjacent parts of said arm at will.

6. Wire looping means according to claim 5, wherein said movable element is pivotally mounted at a position remote from the open end of said radial slot for pivotal movement in a radial direction.

7. Wire looping means according to claim 1, wherein said arm is constituted by part of an open-ended cylindrical shell carried by said drive shaft and dimensioned to receive and protect a said commutator when forming wire armature coils in situ in an armature core associated with and disposed adjacent said commutator on said armature shaft.

8. Wire looping means according to claim 1, including a second wire-looping arm carried on said drive shaft at a position diametrically opposite the first-mentioned wire-looping arm, said second wire-looping arm being the same as said first-mentioned wire-looping arm.

9. Wire looping means according to claim 8, wherein said wire-looping arms are constituted by diametrically-opposite parts of an open-ended cylindrical shell carried by said drive shaft and dimensioned to receive and protect a said commutator when forming wire armature coils in situ in an armature core associated with and disposed adjacent said commutator on said armature shaft.

10. Wire looping means according to claim 3, including a second wire-looping arm carried on said drive shaft at a position diametrically opposite the first-mentioned wire-looping arm, said second wire-looping arm being the same as said first-mentioned wire-looping arm.

11. Wire looping means according to claim 10, wherein said wire-looping arms are constituted by diametrically-opposite parts of an open-ended cylindrical shell carried by said drive shaft and dimensioned to receive and protect a said commutator when forming wire armature coils in situ in an armature core associated with and disposed adjacent said commutator on said armature shaft.

12. Wire looping means for laying a wire in the connection slots of a commutator by an armature shaft of a dynamo-electric machine, which armature shaft also carries an armature core adjacent said commutator, said wire-looping means comprising:
    a drive shaft having a common axis for rotary and axial reciprocatory motion,
    means for mounting said drive shaft in axial alignment with said armature shaft and adjacent said commutator for both rotary and axial motion relative to said armature shaft,
    at least one wire-looping arm carried on said drive shaft adjacent said armature shaft and extending in a direction parallel to but spaced from said common axis and said armature shaft, said arm having a wire-transporting, radial projection extending axially along the surface thereof that is remote from said common axis, and an open-ended, wire-transporting, radial slot disposed beside said projection and extending axially towards said drive shaft, and said arm and said radial slot being dimensioned so as when said drive shaft is in a first axial position said arm and said radial slot extend axially over said commutator and said connection slots,
    a wire-feeding flyer mounted for rotation about an axis perpendicular to said armature shaft for feeding, in a circular manner, said wire from a wire supply source so as to form armature coils in situ in armature core slots, said radial projection having a first axially-extending, wire-engaging surface which (a), when said drive shaft is in said first axial position and is rotated about said common axis in a first direction, engages a said wire extending between a newly-formed armature coil and said flyer and transports it circumferentially around said commutator to a selected connection slot, (b) guides said wire into said selected slot and axially along said commutator as second axial position in which position said arm is clear of said commutator, and (c) guides said wire circumferentially around said armature shaft as said drive shaft is rotated in an opposite direction when in said second axial position, said radial projection also having a second axially-extending, wire-engaging surface adjacent said radial slot, which second surface guides said wire into said radial slot on further rotation of said drive shaft in said opposite direction, after return of said drive shaft to said first axial position so as to engage said wire in said radial slot, which second surface when said radial slot is subsequently re-aligned circumferentially with said selected connection slot guides said wire into said selected connection slot on subsequent movement of said flyer in a coil-forming direction.

13. Wire looping means according to claim 12, wherein said first wire-engaging surface comprises radial and circumferential surfaces which together define a wire-transporting step.

14. Wire looping means according to claim 13, wherein said second wire-engaging surface comprises a surface which is outwardly convex in both axial and circumferential directions relative to said common axis.

15. Wire looping means according to claim 12, wherein said arm is constituted by part of an open-ended cylindrical shell carried by said drive shaft and dimensioned to receive and protect a said commutator when said drive shaft is in said first axial position.

16. Wire looping means according to claim 12, including a second wire-feeding flyer similar to said first-mentioned flyer and disposed opposite and facing said first-mentioned flyer, said second flyer being provided for feeding, in a circular manner, a second said wire from a second wire supply source so as to form armature coils in situ in armature core slots on the side of the armature opposite the armature coils formed by said first-mentioned flyer, and a second wire-looping arm similar to the first-mentioned wire-looping arm and disposed on said drive shaft at a position diametrically-opposite said first-mentioned wire-looping arm.

17. Wire looping means according to claim 16, wherein said first and second-mentioned wire-looping arms are constituted by diametrically-opposite parts of an open-ended cylindrical shell carried by said drive shaft and dimensioned to receive and protect a said commutator when said drive-shaft is in said first axisl position.

18. Wire looping means according to claim 12, including driving means coupled to said drive shaft for effecting, when in operation, rotary and axial motions of said drive shaft and wire looping arm in the following sequence:

a. rotation of said drive shaft in said first direction, when in said axial position, from a starting position to a wire-depositing position in which said first wire-engaging surface of said radial projection lies radially adjacent said selected connection slot, so as to pick up and transport said wire extending between said newly-formed armature coil and said flyer to said selected connection slot;

b. withdrawal of said drive shaft to said axial position so as to uncover said commutator and deposit said wire in said selected connection slow and on the outer surface of said commutator;

c. rotation of said drive shaft in said opposite direction to a wire pick-up position in which said radial slot lies axially in line with said wire extending to said flyer from around said armature shaft;

d. advancement of said drive shaft to said first axial position so as to engage said wire in said radial slot; and e. rotation of said drive shaft in said opposite direction to a second wire-depositing position in which said radial slot lies radially in line with said slected connection slot so as to carry said wire engaged in said radial slot to a position ready for deposit in said selected connection slot on subsequent rotation of said flyer in a coil-forming direction.

19. Wire looping means according to claim 18, wherein said driving means is effective, when rotating said drive shaft to effect said rotation referred to at (c) above, to rotate said drive shaft to a position just beyond said wire pick-up position and then to rotate said drive shaft in said first direction so as to bring said radial slot into axial alignment with said wire in readiness for engagement of said wire in said radial slot when said drive shaft is subsequently advanced to said first axial position.

20. A machine for forming an electrical winding on an armature of a commutator type dynamo-electric machine, which machine includes wire looping means for laying a wire in the connection slots of the commutator of said dynamo-electric machine, said wire looping means comprising:

a drive shaft having a common axis for rotary and axial reciprocating motion, and at least one wire-looping arm carried at one end of said drive shaft and extending in a direction parallel to but spaced from said common axis, said arm having a wire-transporting, radial projection extending axially along the surface thereof that is remote from said common axis, and an open-ended wire-transporting, radial slot disposed beside said projection and extending axially towards said drive shaft, and said arm and said radial slot being dimensioned so as when in operation to extend axially over said commutator and said connection slots when said drive shaft is axially aligned with and disposed adjacent said armature shaft.

21. A machine according to claim 20, wherein aid arm is constituted by part of an open-ended cylindrical shell carried by said drive shaft and dimensioned to receive and protect a said commutator when forming wire armature coils in situ in an armature core associated with and disposed adjacent said commutator on said armature shaft.

22. A machine according to claim 20, including a second wire-looping arm carried on said drive shaft at a position diametrically opposite the first-mentioned wire-looping arm, said second wire-looping arm being the same as said first-mentioned wire-looping arm.

23. A machine according to claim 22, wherein said wire-looping arms are constituted by diametrically-opposite parts of an open-ended cylindrical shell carried by said drive shaft and dimensioned to receive and protect a said commutator when forming wire armature coils in situ in an armature core associated with and disposed adjacent said commutator or said armature shaft.

24. A machine for forming an electrical winding on an armature of a commutator type dynamo-electric machine, which machine includes wire looping means for laying a wire in the connection slots of the commutator of said dynamo-electric machine, said wire looping means comprising:
- a drive shaft having a common axis for rotary and axial reciprocatory motion,
- means for mounting said drive shaft in axial alignment with said armature shaft and adjacent said commutator for both rotary and axial motion relative to said armature shaft,
- at least one wire-looping arm carried on said drive shaft adjacent said armature shaft and extending in a direction parallel to but spaced from said common axis and said armature shaft, said arm having a wire-transporting, radial projection extending axially along the surface thereof that is remote from said common axis, and an open-ended, wire-transporting, radial slot disposed beside said projection and extending axially towards said drive shaft, and said arm and said radial slot being dimensioned so as when said drive shaft is in a first axial position said arm and said radial slot extend axially over said commutator and said connection slots,
- a wire-feeding flyer mounted for rotation about an axis perpendicular to said armature shaft for feeding, in a circular manner, said wire from a wire supply source so as to form armature coils in situ in armature core slots,
- said radial projection having a first axially-extending, wire-engaging surface which (a), when said drive shaft is in said first axial position and is rotated about said common axis in a first direction, engages a said wire extending between a newly-formed armature coil and said flyer and transports it circumferentially around said commutator to a selected connection slow, (b) guides said wire into said selected slot and axially along said commutator as said drive shaft is axially withdrawn from said commutator to a second axial position in which position said arm is clear of said commutator, and (c) guides said wire circumferentially around said armature shaft as said drive shaft is rotated in an opposite direction when in said second axial position,
- said radial projection also having a second axially-extending, wire-engaging surface adjacent said radial slot, which second surface guides said wire into said radial slot on further rotation of said drive shaft in said opposite direction, after return of said drive shaft to said first axial position so as to engage said wire in said radial slot, which second surface when said radial slot is subsequently re-aligned circumferentially with said selected connection slot guides said wire into said selected connection slot on subsequent movement of said flyer in a coil-forming direction.

25. A machine according to claim 24, wherein said arm is constituted by part of an open-ended cylindrical shell carried by said drive shaft and dimensioned to receive and protect a said commutator when said drive shaft is in said first axial position.

26. A machine according to claim 24, including a second wire-feeding flyer similar to said first-mentioned flyer and disposed opposite and facing said first-mentioned flyer, said second flyer being provided for feeding, in a circular manner, a second said wire from a second wire supply source so as to form armature coils in situ in armature core slots on the side of the armature opposite the armature coils formed by said first-mentioned flyer, and a second wire-looping arm similar to the first-mentioned wire-looping arm and disposed on said drive shaft at a position diametrically-opposite said first-mentioned wire-looping arm.

27. A machine according to claim 26, wherein said first and second-mentioned wire-looping arms are constituted by diametrically-opposite parts of an open-ended cylindrical shell carried by said drive shaft and dimensioned to receive and protect a said commutator when said drive shaft is in said first axial position.

28. A machine according to claim 24, including driving means coupled to said drive shaft for effecting, when in operation, rotary and axial motions of said drive shaft and wire looping arm in the following sequence:
a. rotation of said drive shaft in said first direction, when in said axial position, from a starting position to a wire-depositing position in which said first wire-engaging surface of said radial projection lies radially adjacent said selected connecton slot, so as to pick up and transport said wire extending between said newly-formed armature coil and said flyer to said selected connection slot;
b. withdrawal of said drive shaft to said second axial position so as to uncover said commutator and deposit said wire in said selected connection slot and on the outer surface of said commutator;
c. rotation of said drive shaft in said opposite direction to a wire pick-up position in which said radial slot lies axially in line with said wire extending to said flyer from around said armature shaft;
d. advancement of said drive shaft to said first axial position so as to engage said wire in said radial slot; and
e. rotation of said drive shaft in said opposite direction to a second wire-depositing position in which said radial slot lies radially in line with said selected connection slot so as to carry said wire engaged in said radial slot to a position ready for deposit in said selected connection slot on subsequent rotation of said flyer in a coil-forming direction.

* * * * *